No. 857,838. PATENTED JUNE 25, 1907.
F. G. SHAW.
SPECTACLES, MOTOR GOGGLES, AND THE LIKE.
APPLICATION FILED JULY 27, 1906.

Witnesses:
J. K. Moore
F. H. Hubbard

Inventor:
Frederick G. Shaw
by
Whitaker Prevost atty

UNITED STATES PATENT OFFICE.

FREDERICK GEORGE SHAW, OF LONDON, ENGLAND.

SPECTACLES, MOTOR-GOGGLES, AND THE LIKE.

No. 857,838.	Specification of Letters Patent.	Patented June 25, 1907.

Application filed July 27, 1906. Serial No. 328,104.

*To all whom it may concern:*

Be it known that I, FREDERICK GEORGE SHAW, a subject of the King of Great Britain, residing at 11 Neville Court, Abbey Road, London, England, have invented new and useful Improvements Relating to Spectacles, Motor-Goggles, and the Like, of which the following is a specification.

My invention relates to spectacles, motor goggles and the like and has for its object to provide means whereby such spectacles or goggles while being securely held in position may be readily moved from a position for use into an out of the way position or vice versa. According to my invention I provide a pair of arms adapted at one end to be pivotally connected to the side of a cap or hat and at the other end connected to the side bars of the spectacles or goggles.

Figure 1:
Figure 2:
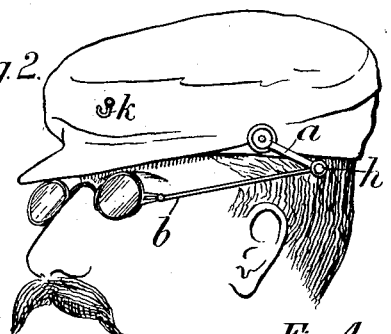
Figure 3:
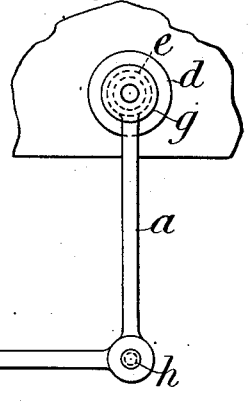
Figure 4:
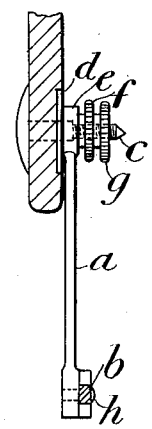
Figure 5:
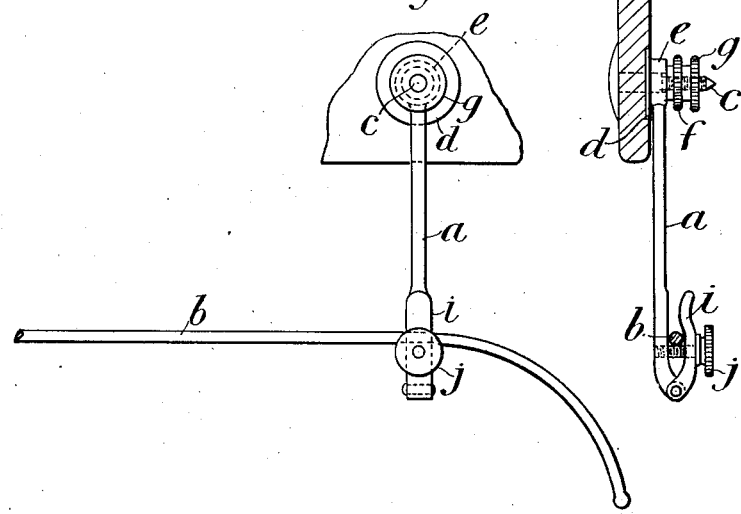
Figure 6:
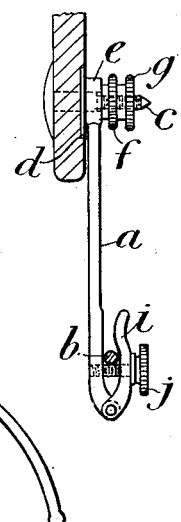

In the accompanying drawing:—Figure 1 is a perspective view showing a pair of spectacles arranged in accordance with my invention and applied to a cap, the said spectacles being in the position which they occupy when not required for use. Fig. 2 is a view similar to Fig. 1 but showing the position of the device when the spectacles are in use. Figs. 3 and 4 are respectively a side view and an end view illustrating the essential part of my invention, and Figs. 5 and 6 are views similar to Figs. 3 and 4 respectively illustrating the use of my invention in connection with an ordinary pair of spectacles.

*a* is one of a pair of arms to which the side bars *b* of the spectacles are connected, the said arm at its upper end being pivotally mounted on a headed screw *c*, the shank of which is designed to be forced through the material of the cap from the inside at the desired point; on the outer portion of the shank is threaded, first, a loose washer *d*, then the eye *e* of the arm, then another loose washer *f* and finally a nut *g* which serves to clamp all the parts in place while allowing sufficient freedom of movement to permit of the arm pivoting about the shank to the desired extent.

The side bars of the spectacles may be permanently pivoted to the free ends of the side bars, as indicated at *h* in Figs. 3 and 4. If desired, however, the free ends of the arms *a* may each be formed with a clamp, for instance, as shown in Figs. 5 and 6 where *i* indicates the hinged member of a clamp and *j* a screw for adjusting the same, which screw passes freely through the hinged member *i* and is screwed into the arm itself. The use of this clamp enables my invention to be used in connection with ordinary spectacles the side bars of which are inserted into the clamp and held therein.

With this construction it will be understood that when the spectacles or goggles are in use resting on the bridge of the wearer's nose they are so securely held by the pivoted arms *a* that they cannot be accidentally knocked off and that by pulling the spectacles forward to clear the front of the cap and then lifting them upwardly they may be caused to rest on the cap where they will likewise be securely held.

If desired, an attachment such as a hook *k* may be fixed upon the front of the cap with which the spectacles can be engaged when not in use.

My invention is of especial advantage to persons engaged in fishing, in which pastime spectacles may only be required or desired when baiting the hook or inspecting the same.

Having now particularly described and ascertained the nature of my said invention and in what manner the same is to be performed, I declare that what I claim is:—

1. The combination with a pair of spectacles provided with side bars, of links secured to said side bars and means for pivoting said links to an article of head apparel whereby said links will move in a plane substantially perpendicular to the article of head apparel, substantially as described.

2. The combination with a pair of spectacles provided with side bars, of links secured to said side bars and means for detachably pivoting said links to an article of head apparel whereby said links will move in a plane substantially perpendicular to the article of head apparel, substantially as described.

3. The combination with a pair of spectacles provided with side bars, of links detachably secured to said side bars and means for pivotally securing said links to an article of head apparel whereby said links will move in a plane substantially perpendicular to the article of head apparel, substantially as described.

4. The combination with a pair of spectacles of the kind described provided with side bars, of links secured at one end to said side bars, and provided at their other end with an orifice, headed screws having shanks adapted to be forced through an article of head apparel and adapted to be inserted in the orifices in said links and nuts adapted to be screwed onto the ends of said shanks of said headed screws substantially as described.

5. The combination with a pair of spectacles of the kind described provided with side bars, of links, each of said links being provided at one end with a hinged member adapted to clamp said side bars of said spectacles to said links, means for retaining said hinged members of said links in engagement with said side bars and means for pivotally securing the other end of each of said links to an article of head apparel, substantially as described.

FREDERICK GEORGE SHAW.

Witnesses:
A. ALBUTT,
H. D. JAMESON.